United States Patent [19]

Tsaprazis

[11] Patent Number: 4,961,069
[45] Date of Patent: Oct. 2, 1990

[54] DUAL OPTICAL LEVEL MONITOR
[75] Inventor: Edward Tsaprazis, Havertown, Pa.
[73] Assignee: Aeroquip Corporation, Jackson, Mich.
[21] Appl. No.: 280,840
[22] Filed: Dec. 7, 1988
[51] Int. Cl.⁵ .................................. G08B 21/00
[52] U.S. Cl. ........................... 340/619; 250/577; 73/293; 340/450
[58] Field of Search ............... 340/450, 619, 450.2; 73/293; 250/577

[56] References Cited

U.S. PATENT DOCUMENTS

| | | | |
|---|---|---|---|
| 3,120,125 | 2/1964 | Vasel | 73/293 |
| 3,683,196 | 8/1972 | Obenhaus | 250/227 |
| 3,882,887 | 5/1975 | Rekai | 73/293 X |
| 3,957,342 | 5/1976 | Newns et al. | 350/96 M |
| 4,242,590 | 12/1980 | von Tluck | 250/577 |
| 4,246,489 | 1/1981 | Yoshida et al. | 250/577 |
| 4,286,464 | 9/1981 | Trauber et al. | 73/293 |
| 4,354,180 | 10/1982 | Harding | 340/619 |
| 4,366,384 | 12/1982 | Jensen | 250/577 X |
| 4,450,722 | 5/1984 | Keys, IV et al. | 73/293 |
| 4,670,660 | 6/1987 | Kuhlen et al. | 250/577 |

FOREIGN PATENT DOCUMENTS

32602 4/1934 Netherlands ................. 73/293

Primary Examiner—Joseph A. Orsino
Assistant Examiner—Jeffery A. Hofsass
Attorney, Agent, or Firm—Lipton & Famiglio

[57] ABSTRACT

A failure protected optical fluid monitor is disclosed that uses, in combination, a single prism paired systems of light sources and light detectors to determine whether or not liquid in a container is present at a predetermined level. A pair of light sources and coordinated photodetectors are fitted behind the flat end of a conical prism and each light source is adapted to direct a beam of light through the flat rear surface of the prism onto an angled face of prism. If a liquid is in contact with the conical surface of the prism, most of the light is refracted at the prism's surface and exits into the liquid. Under these conditions the light detector are not activated. If no liquid is in contact with the conical surface of the prism, the light beams will be totally internally reflected at both conical surfaces of the prism and will exit on the opposite sides of the prism from the light source parallel to its initial direction. Each light beam is then detected by a photodetector. The presence of light will cause the photoelectric sensor to pass a current. By using dual light sources with dual light sensors, it is possible to guard against an undetected liquid level change masked by failure of a single light source of detector.

27 Claims, 5 Drawing Sheets

DUAL OPTICAL LEVEL MONITOR

BACKGROUND OF THE INVENTION

1. Field of the Invention

The present invention relates to optical sensors for monitoring the level of fluid in containers. In the operation of various kinds of motor driven equipment, it is often necessary to monitor the liquid levels in a container. In readily accessible or visible containers, such as most automotive equipment, it is possible to use dip sticks and floating indicators to measure the levels of liquids in the container. In less accessible situations, such as where there is a need to measure the fuel level in fuel tanks of operating airplanes or in other closed container situations, a variety of optical level sensing devices have been used to detect liquid level problems and to electronically or otherwise alert the operator of the equipment to liquid level problems One type of prior art sensor uses a light source and a detector to determine whether light that enters a prism inserted into a container (e.g. a fuel tank) passes through the prism into the surrounding liquid to indicate an adequate liquid level or is reflected within the prism to indicate the absence of a liquid. In such devices, a visual or electrical signal is generated to indicate the absence of liquid A problem with such existing devices is that there is no way to instantly detect the failure of the light source or detector, which failure could mimic the indication of a satisfactory condition. This could result in the absence of an alerting signal when, in fact, there is a dangerously low liquid level Obviously, generating a false reading that indicates sufficient liquid levels when levels are not sufficient could have disasterous consequences when used in moving aircraft or ground vehicles The present system improves upon the prior art by using paired systems of light sources and sensors (e.g. light emitting diodes and light sensitive transistors). In the present system, particular photodetectors are located in positions to detect and respond to discrete light sources so as to provide output that can be converted to panel gauge readings for use in, for example, an airplane. Such panel readings can, in addition, be adapted to enable the operator to either visually or by electronic means detect a non-operational light source.

The ability of adjacently located photodetectors to sense only one of two light sources both of which are totally internally reflected by a conical prism was heretofore unexpected. Previously it was thought that the simultaneous total internal reflection of two light sources directed at different surfaces of a conical prism would be so diffuse as to cause two light detectors that were in physical proximity to each other to both respond to reflected or scattered rays from both sources. It was found, however, that a single photodetector responds only to the light beam from its paired light source.

2. Description of the Prior Art

To meet the need for a reliable level sensor for use where level detection is critical to the performance of equipment, a number of optical sensors using the principles of refraction and total reflection have been developed. These devices work on the principle, known as Snell's Law, whereby light rays are refracted when they move from one material to another. The ratio of the velocity of light in a particular material to the velocity of light in a vaccum is called the index of refraction "n" for that material. The relationship between the incident and refracted rays of light passing through an interface between the materials is given by:

$$n \sin i = n' \sin i'$$

where n is the index of refraction of the first medium and n' is the index of refraction of the second medium; "i" is the angle to the normal of the incident ray and "i'" is the angle of refraction (angle between the refracted ray and the normal). Total internal reflection of the incident light occurs when the refracted light is bent away from the normal so that it crosses the interface between the two materials (i'=90). Total internal reflection occurs whenever;

$$i > \sin^{-1}(n')$$

Examples of the use of optical liquid sensors occur in the patents mentioned below.

U.S. Pat. No. 4,670,660 teaches a self sufficient visual liquid level sensor that uses light refraction measurements from an illuminated prismatic member. Such a visual sensor is not adapted for use in closed containers contemplated by the present inventions, such as fuel tanks of airplanes U.S. Pat. No. 4,286,464, by Tauber et al, uses a plurality of prisms and electronic detectors arranged in a linear array The "bulls-eye" type of prism detectors are able to detect liquid levels surrounding a prism where the prism is not totally immersed in a liquid. The prisms and coordinated detectors, which are each illuminated by a small light source, are arranged vertically so that in use each one will sense a different level of liquid. As the array of prismatic detectors are sequentially illuminated by light sources, they emit a visual output in the form of a short pulse of light. By electronically counting the number of pulses detected in any single scan and converting these pulses to an analog or digital panel reading (e.g. for use in aircraft), calculated as a function of the empty height of the container, a composite fluid height is determined at a particular instant.

U.S. Pat. No. 4,450,722, by Keyes et al, discloses a liquid level detector which comprises a liquid column in which different color lights detect the presence or absence of water in the column. A dual detector assembly of color detectors alerts an operator to the presence or absence of a water condition.

U.S. Pat. No. 4,246,489, by Yoshida et al, includes a rectangular prism refractor for transmitting a particular wavelength through the prism. The invention utilizes a light emitting element and a photo electric conversion element adjacent to the face of the prism.

U.S. Pat. No. 4,354,180, by Harding teaches a sensor comprising a transparent body having a means to shine a light beam on the surface area of the body and through the body into a liquid or dry medium. The innovation is a means for intercepting a portion of the beam and reflecting the intercepted portion of the beam to an area where it is detected by an alarm activating means. Thus, a failure of a light source can be detected by means of optical electronics, when used in a circuit as part of electronic components.

U.S. Pat. No. 4,366,384 teaches a detector for detecting air bubbles within a conduit. It consists of a conduit for the passage of fluid in which the conduit has an inner wall that is reflective. A light source is positioned beside the conduit. There is a light detecting means for sensing direct light passing through the fluid in the conduit and a second light detecting means for receiving light reflected by the inner wall of the conduit. Where the difference in the direct light and reflected light detected is greater than a reference level, the presence of air bubbles is indicated in the circuit.

U.S. Pat. No. 3,683,196 teaches a differential fluid level detector for sensing the presence of a fluid medium at a first and second medium level. At least one light sensor is placed in optical communication with the pre-determined light reflection path. A light emitting means emits a light beam through a light refracting means such as a prism. The light refracting means includes a first and second light refracting body portion.

U.S. Pat. No. 4,242,590 teaches a single light source prism detector with a photo electric sensor at the non-sensing ends of the detector. A circuit connected to the photo electric detector detects reflected light and has a hysteresis effect for avoiding extreme fluctuation in responses to fluid slopping "to and fro" in the container.

U.S. Pat. No. 3,882,887 teaches an optical level sensing system having a light emitting diode that produces pulsating light that is transmitted through a prism. A sensing device indicates changes in the reflection of the light to show differences in the fluid level around the prism.

The previously mentioned devices lack the dual light source and dual sensor system, combined with a single prism, for detection of a liquid level as found in the present invention.

SUMMARY OF THE INVENTION

The subject invention comprises a failure protected system for determining the liquid level in a container (e.g. an aircraft fuel tank) and converting the measurement to an indicator reading on a panel such as a control panel of an airplane or of an airplane fuel dispensing system.

The invention comprises the combination of a conical prism (typically 90°) attached in front of a housing containing a pair of light sources and a pair of photodetectors. Each light source is adapted to direct a narrow beam of light perpendicular to the flat rear surface of the prism. If there is liquid contacting the conical surface of the prism, the light is refracted through the prism and into the liquid. If there is no liquid contacting the conical surface of the prism, the light will be twice totally internally reflected by the conical prism and will exit the prism perpendicularly through the the flat rear surface of the prism where it is intercepted by a photodetector. The position of the light source within the housing will determine in which position the light beam will hit the prism and, therefore, which photodetector the reflected light will activate. Although it was originally throught that multiple light beams directed through a conical prism in the absence of contacting liquid would be diffusely reflected within the prism so that both detectors sensed light from each source that it would not be practical to use two sensors within a single housing to serve as back up detectors for each other, that does not turn out to be the case. It was discovered through experiment that light beams that are narrow enough and which hit the prism from different directions and are totally reflected within the prism will only be detected by sensors located within each light beams return path. By using at least two light sources and sensors, it is possible to guard against failure of either light source or its photodetector in the system. Further, the operation of the individual light sources can be monitored by a testing circuit connected to computer means Each sensor (light, detector, and electronics) in the dual monitor will generate a current based on the amount of light reflected back to it. The indication of the currents generated can be accomplished using auxiliary electric circuits which may then be connected to analog or digial computer systems.

In addition, several other properties can be built into the present system. Because of the possibility of constantly fluctuating liquid levels, it has been found desirable to build a time delay into the signal reporting means to increase the significance of detected readings. The time delay may also be used to allow a period of time for completion of tank filling after the liquid has reached the monitor's level.

Accordingly, the main object of the subject invention is to provide through the redundancy of means a failure protected system capable of detecting the liquid level in a container.

A second object of the invention is to allow the operator to detect when a light source or photodetector is non-operational so as to allow replacement of the unit.

A third object of the invention is to provide an output from a liquid level detector that can be converted into an indication on an operator's instrumentation panel.

A fourth object of the invention is to provide a system with a time delay means within the system so that small fluctuations of levels within a liquid container do not generate false or confusing readings by the sensors.

A fifth object of the invention is to provide a system with a time delay means so that tank filling may be completed after the liquid has reached the monitor's level.

A sixth object of the present invention is to provide a system to enable an operator to distinguish between a safe liquid level indicated by the absence of an alerting signal and a defective signal circuit or light source.

A seventh object of the present invention is to provide a compact sensor that is easy to introduce into a system to be monitored.

Other advantages of the present invention will be set forth in the description which follows, taken together with the accompanying drawings in which like numbers represent like parts.

DESCRIPTION OF THE PREFERRED EMBODIMENT

Figure 1:
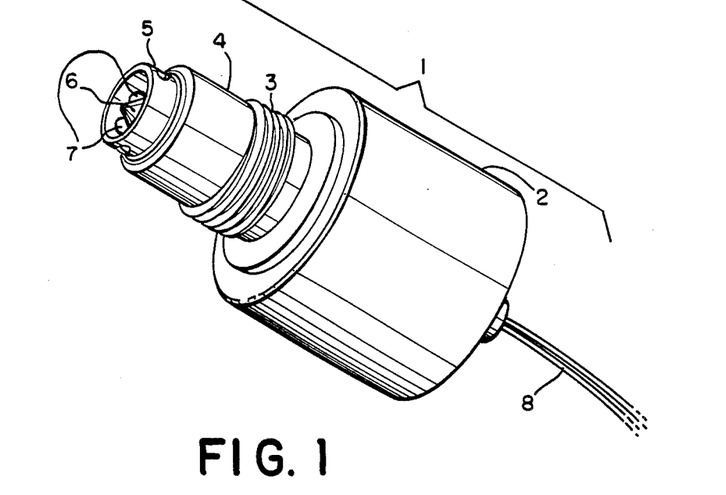
FIG. 1 is an oblique external view of the detector housing.

FIG. 1 is an oblique external view of the assembled dual optic liquid level. A conical prism 6 is shown surrounded by a collar 5 having liquid access holes 7 through it. In the preferred embodiment the conical prism 6 may be composed of borosilicate glass or "pyrex" glass. The prism 6 and collar 5 are mounted at the end of housing section 4 which contains the light emitting and receiving apparatus which is not shown in FIG. 1. A threaded section 3 is provided for securing the sensor 1 in place in the tank in which a level is to be determined. Wires 8 which conduct the electrical output of the sensor 1 are lead out from the end of housing section 2.

Figure 2:
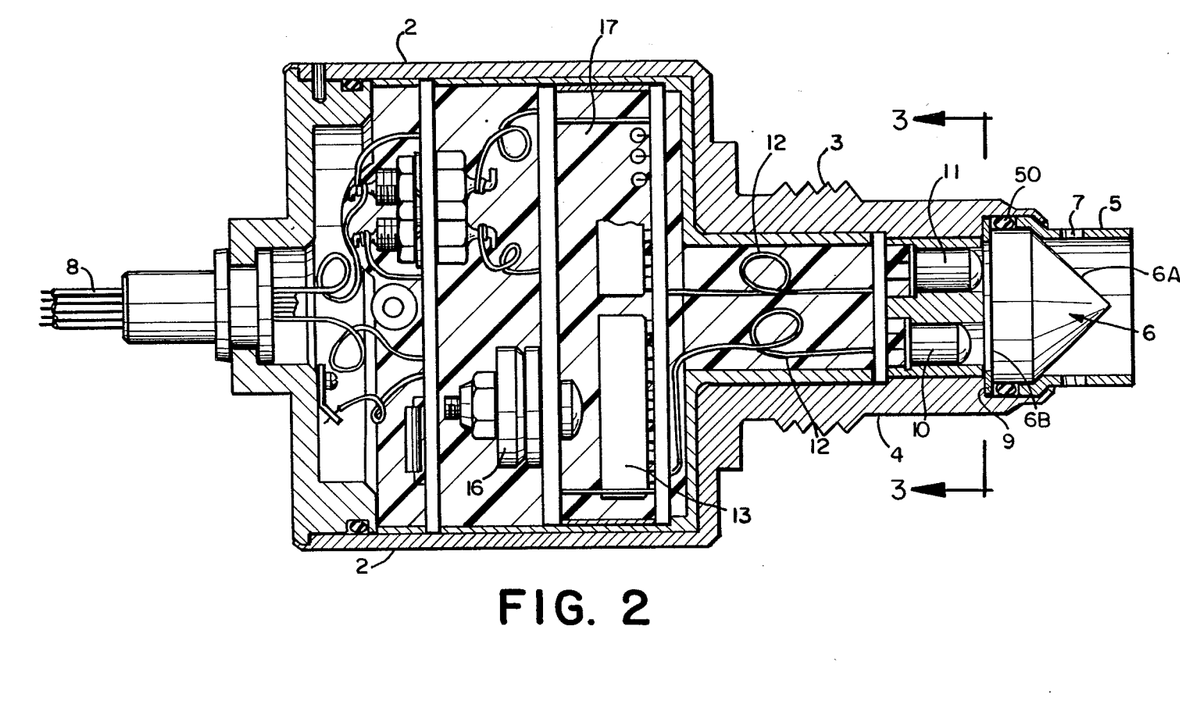
FIG. 2 is a cross sectional view of the detector housing and enclosed parts.

FIG. 2 is a cross sectional view of the sensor. Conical prism 6, having angled surface 6A and flat rear surface 6B, is shown mounted within the collar 5. "0" ring 50 seals the electronics of the sensor from any liquid that comes in contact with the prism 6. Collar 5 is shown with holes 7 which allow the fluid being sensed to pass through collar 5 and contact prism 6. A spacer 9 supports the flat rear surface 6B of prism 6. Light emitting diode 10 is shown aligned parallel with its associated photodetector 11 within housing 4. Wires 12 lead from light emitting diode 10 and photodetector 11 to the hybrid electronic circuit 13. An output transistor 16 and the remainder of the electronics are embedded in a protective matrix 17 within housing section 2.

Figure 3:
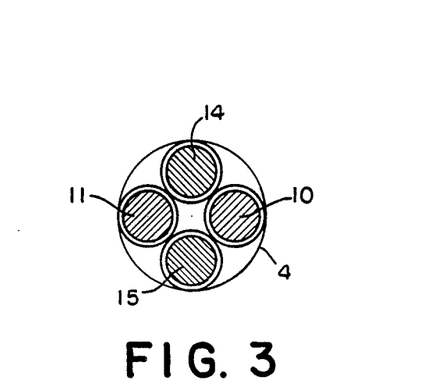
FIG. 3 is a view of the light sources and their paired photodectors taken along line 3—3 of FIG. 2.

FIG. 3 is an end on schematic view of the sensor 1 along line 3—3 shown in FIG. 2. The paired light emitting diode 10 and photodetector 11 can be seen located on the same diameter directly across from each other in housing 4. Similarily, light emitting diode 14 and its associated photodetector 15 are located directly across from each other in housing 4 on another diameter at right angles to the first.

Figure 4A:
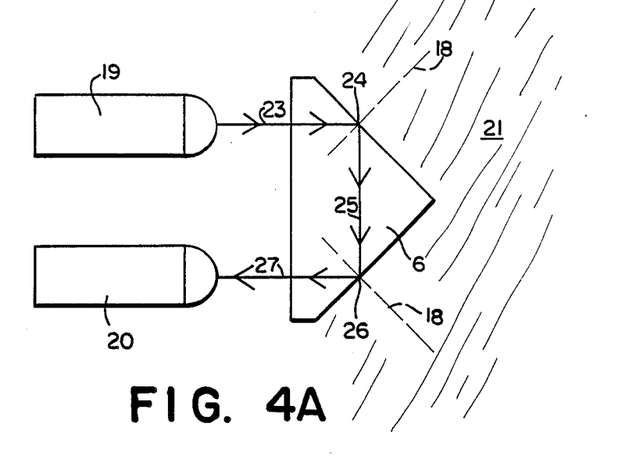
FIGS. 4A and 4B show the optical characteristics of the invention in the absence and presence of a monitored liquid.
Figure 4B:
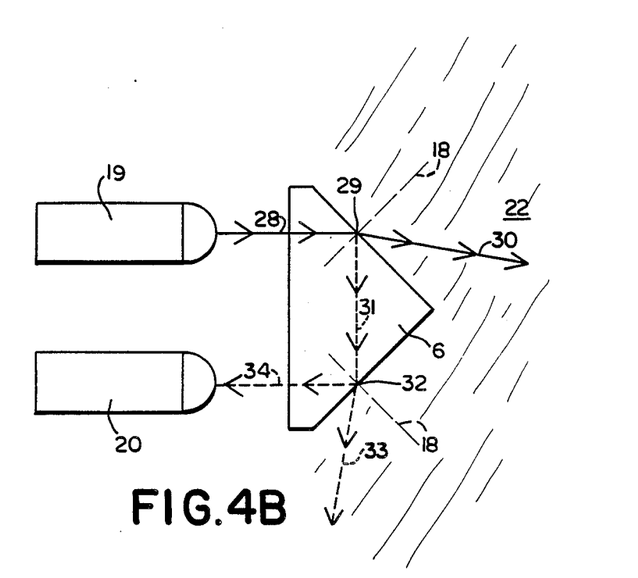

FIG. 4 shows the optical paths that the light from the light emitting diode of each pair trasverses through the conical prism 6. In FIG. 4A the medium 21 in contact with the external surface of the conical prism 6 is air or a similar gas. In FIG. 4B the medium 27 in contact with the external surface of the conical prism 6 is a fluid, typically water or gasoline. Normals 18 are shown to the cross section of the conical surface 6A of the prism 6. In FIG. 4A, a light ray 23 from light emitting diode 19 is incident to the inside surface of the glass prism 4 at 24. Since the index of refraction of the glass forming prism 6 is substantially different from the index of refraction of the surrounding medium 21 of air, and since the angle of the conicle section of the prism has been designed so that the angle of incidence of ray 23 at 24 is greater than the critical angle, ray 23 is totally internally reflected at point 24 as ray 25. Ray 25 in turn, for the same reasons, is totally reflected at 26 as ray 27. Ray 27 returns on a path parellal to ray 23 to photodetector 20.

In FIG. 4B ray 28 from light emitting diode 19 strikes the inner surface of conical prism 6 at 29. However, now the index of infraction of the medium 22 is not substantially different from the index of refraction of the glass from which prism 6 is made, and total internal reflection does not occur. Instead, ray 30 exits from the surface of the prism 6 into the fluid medium 22. While most of the light exits as ray 30, some of the light is reflected as ray 31 within the conical prism. Ray 31 strikes the opposite surface of the prism at 32 and again, because the index refraction of the glass is similar to the index of refraction of the fluid medium 22, most of the remaining light energy exits the prism as ray 33. However, once again, a very small fraction of the ray 31 is internally reflected as ray 34 which then inpinges on photodetector 20. Rays 31, 33 and 34 are shown as dashed lines indicating a much reduced intensity.

In practice, a 90° prism is typically used. Thus, in FIG. 4A, ray 23 strikes the glass/air interface of the cone at 24 at about a 45° angle. A typical glass from which the prism is formed has an index of refraction of approximately 1.5. Since the air 21 in FIG. 4A has an index of refraction of approximately 1.0, the 45° angle of incidence of ray 23 meets the condition sufficient for total internal reflection. Gasoline and other fuel compounds typically have indexes of refraction of approximately 1.4 to 1.5 while water has an index refraction of approximately 1.33. As shown in FIG. 4B, with a glass conical prism having an index refraction of approximately 1.5, the 45° angle of incident ray 28 to the cone surface at 29 does not meet the conditions for total internal reflection when the external medium is one of the above mentioned fluids.

Figure 5:
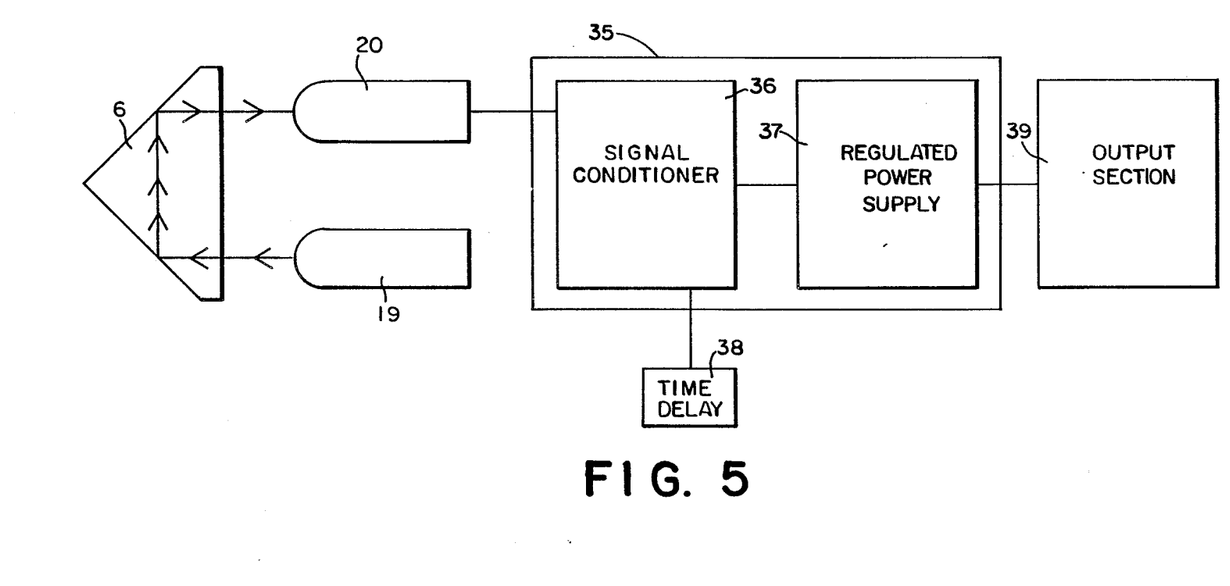
FIG. 5 is block diagram of the circuit associated with the present invention.

FIG. 5 shows a blocked diagram of the optical and electronic systems of the invention. Only one of the two parallel optical and electronic systems in shown. Light from light emitting diode 19 is totally internally reflected twice within prism 6 and returned to photodetector 20. The output from photodetector 20 goes into hybrid electronic circuit 35 which contains a signal conditioner 36 and a regulated power supply 37. A time delay circuit 38 is also provided The output from the hybrid circuit goes to an output section 39.

Figure 6:
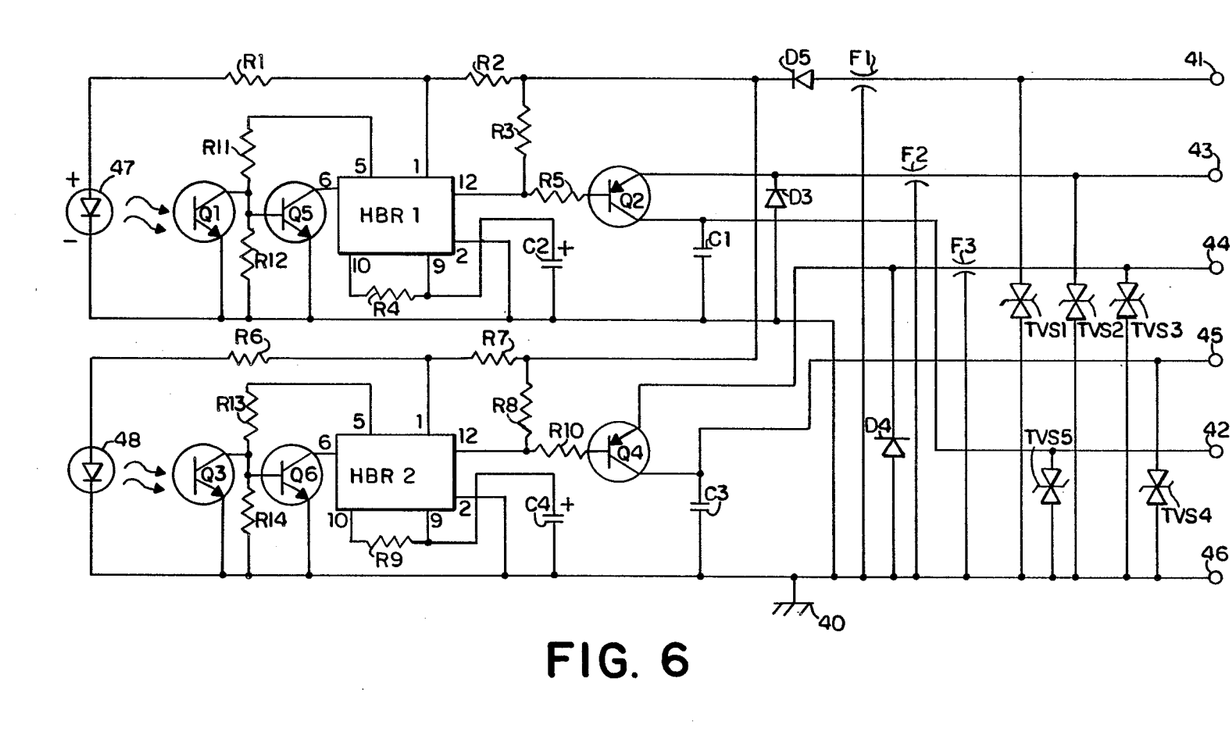
FIG. 6 is a circuit diagram of the present invention.

FIG. 6 shows a typical schematic for the electronic circuit that is employed with the sensor. The electronics for the two parallel light and photodetector circuits that make up the dual sensor are shown. Power is supplied on line 41. Current is permitted to continuially flow through light emitting diodes 47 and 48 so that the light sources are always on. Thus, when the conical prism surface is exposed to air, light from each light emitting diode in totally internally reflected to its associated photodetector and, photodetectors Q1 and Q3 will be in the conducting mode. When the conical prism is immersed in a fluid, total internal reflection no longer occurs, and no light will reach photodetectors Q1 and Q3 and they will be non-conducting. Transitors Q5 and Q6 flip flop the output from the photodetectors, that is; when photodetectors Q1 and Q3 are conducting, Q5 and Q6 are non-conducting. Similarily when Q1 and Q3 are non-conducting, transistors Q5 and Q6 will be conducting. Hybrid electronic modules HBR1 and HBR2 supply a stable regulated power supply to pins 5 of the hybirds. Resistor capacitor combinations R4 and C2 and R9 and C4 are time delay circuits which delay the output from the associated hybrid circuits at pin 12 for a predetermined time after there has been a change in the condition at photodetectors Q1 and Q3. The output on pin 12 from hybrid circuits HBR1 and HBR2 drive output transistors Q2 and Q4. The power to the emitters of output transistors Q2 and Q4 is supplied by separate power lines 43 and 44. The final output signal from the electronics is provided on lines 42 and 45 which come from the collectors of output transistors Q2 and Q4. All outputs as well as the circuit are referenced to ground 40.

The flip flop transisters Q5 and Q6 insure that a change in the signals from the dual circuits will occur when the sensor first has power applied unless the sensor already detects liquid. When liquid in present, photodetectors Q1 and Q3 receive no light and are off, transistors Q1 and Q3 are on, and output transistors Q2 and Q4 are off.

What is claimed is:

1. A sensor for determining the presence or absence of fluid which comprises:

a. a conical prism having a flat base wherein part of the prism's exterior conical surface extends into the space where the presence or absence of fluid is to be sensed;

b. a plurality of light sources adapted to direct light into the flat base of the prism towards the conical surface of the prism; and c. a plurality of photodetectors adapted to intercept light emerging from the flat base of the prism such that each photodetector is paired with a different light source by being positioned to receive light when the light from said source is twice totally internally reflected within the prism wherein each photodetector generates a signal when light from the light source with which it is paired strikes the photodetector.

2. The sensor of claim 1 wherein the conical prism is formed from a material which is resistant to petroleum distillates.

3. The sensor of claim 2 wherein the conical prism is formed from glass.

4. The sensor of claim 3 wherein the conical prism is formed from borosilicate glass.

5. The sensor of claim 3 wherein the conical prism is formed from "pyrex" glass.

6. The sensor of claim 1 wherein the conical prism has a base angle of 45 degrees.

7. The sensor of claim 2 wherein the material from which the conical prism is formed has a refractive index in the range of 1.4 to 1.6.

8. The sensor of claim 2 wherein the material from which the conical prism is formed has a refractive index substantially the same as the refractive index of the fluid to be detected.

9. The sensor of claim 1 wherein the light sources are light emitting diodes.

10. The light emitting diodes of claim 9 which direct a substantially perpendicular beam of light into the flat end of the conical prism.

11. The sensor of claim 1 wherein the photodetectors are solid state light sensitive devices.

12. The sensor of claim 1 wherein there are two sets of light source-photodetector pairs.

13. The sensor of claim 12 wherein the two sets of light source-photodetector pairs are arranged at ninety degrees with respect to each other about the base of the conical prism.

14. A system of a sensor and detecting circuitry for determining the presence or absence of fluid which comprises:

a. a conical prism having a flat base wherein the prism's exterior conical surface extends into the space where the presence or absence of fluid is to be sensed;

b. a plurality of light sources adapted to direct light into the flat base of the prism towards the conical surface of the prism;

c. a plurality of photodetectors adapted to intercept light emerging from the flat base of the prism such that each photodetector is paired with a different light source by being positioned to receive light when the light from said source is twice totally internally reflected within the prism wherein each photodetector generates a signal when light form the light source with which it is paired strikes the photodetector; and d. a plurality of signal detecting circuits each responsive to one light source-photodetector pair to alert an operator or monitor of the sensor to the presence of a change in the signal generated from each light source-photodetector pair wherein a failure or error in the sensor is indicated when the outputs from two or more light source-photodetector pairs do not indicate the same information with respect to whether liquid is or is not present at the sensor.

15. The system of claim 14 wherein the conical prism is formed from a material which is resistant to petroleum distillates.

16. The system of claim 14 wherein the conical prism is formed from glass.

17. The system of claim 16 wherein the conical prism is formed from borosilicate glass.

18. The system of claim 16 wherein the conical prism is formed from "pyrex" glass.

19. The system of claim 14 wherein the conical prism has a base angle of 45 degrees.

20. The system of claim 15 wherein the materials from which the conical prism is formed has a refractive index in the range of 1.4 to 1.6.

21. The system of claim 15 wherein the material from which the conical prism is formed has a refractive index substantially the same as the refractive index of the fluid to be detected.

22. The system of claim 14 wherein the light sources are light emitting diodes.

23. The light emitting diodes of claim 22 which direct a substantially perpendicular beam light into the flat end of the conical prism.

24. The system of claim 14 wherein the photodetectors are solid state light sensitive devices.

25. The system of claim 14 wherein there are two sets of light source-photodetector pairs.

26. The system of claim 25 wherein the two sets of source-detector pairs are arranged at ninety degrees with respect to each other.

27. The signal detecting circuits of claim 19 further comprising light source with are continuously powered to provide constant sources of light.

* * * * *

UNITED STATES PATENT AND TRADEMARK OFFICE
CERTIFICATE OF CORRECTION

PATENT NO. : 4,961,069

DATED : October 2, 1990

INVENTOR(S) : Edward Tsaprazis

It is certified that error appears in the above-identified patent and that said Letters Patent is hereby corrected as shown below:

Column 8, line 10, the word "form" should be deleted and in stead the word --from-- should be placed.

Column 8, line 52, the number "19" should be deleted and in its stead the number --14-- should be placed.

Column 8, line 53, the word "with" should be deleted and in its stead the word --which-- should be placed.

Signed and Sealed this

Sixteenth Day of November, 1993

*Attest:*

BRUCE LEHMAN

*Attesting Officer*    *Commissioner of Patents and Trademarks*